Sept. 18, 1956     C. C. TURNER     2,763,111
HUMANE TAIL SET
Filed Nov 30, 1950
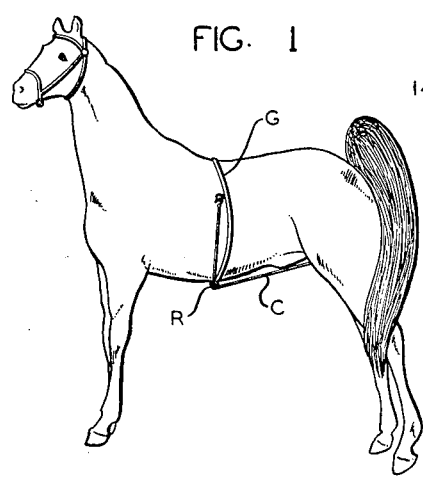
FIG. 1
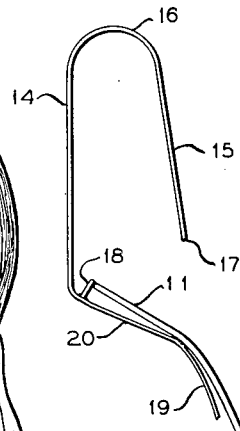
FIG. 2
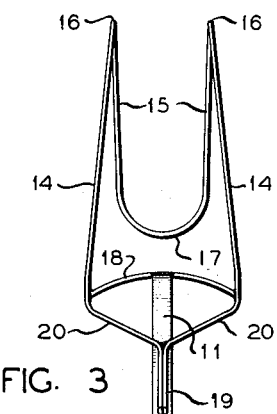
FIG. 3
FIG. 5
FIG. 4
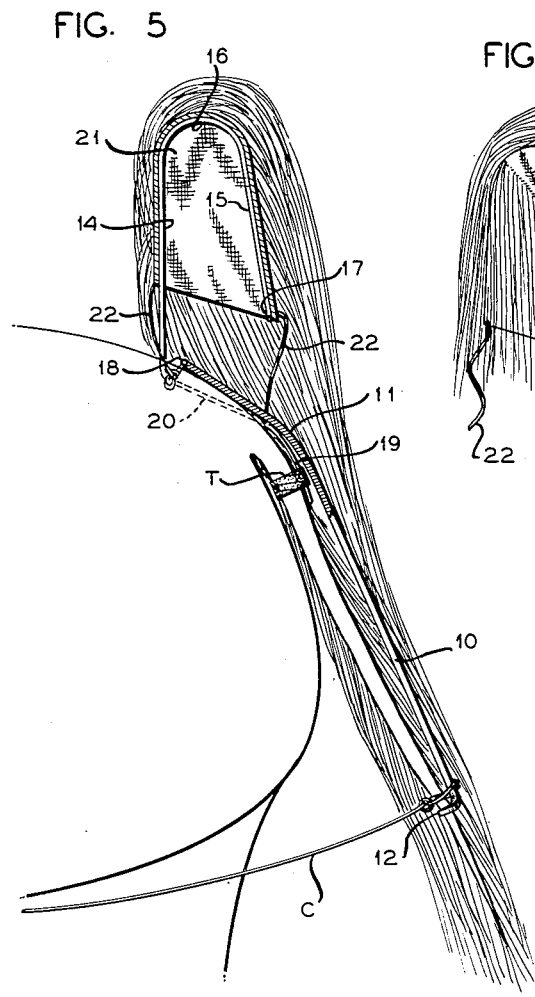
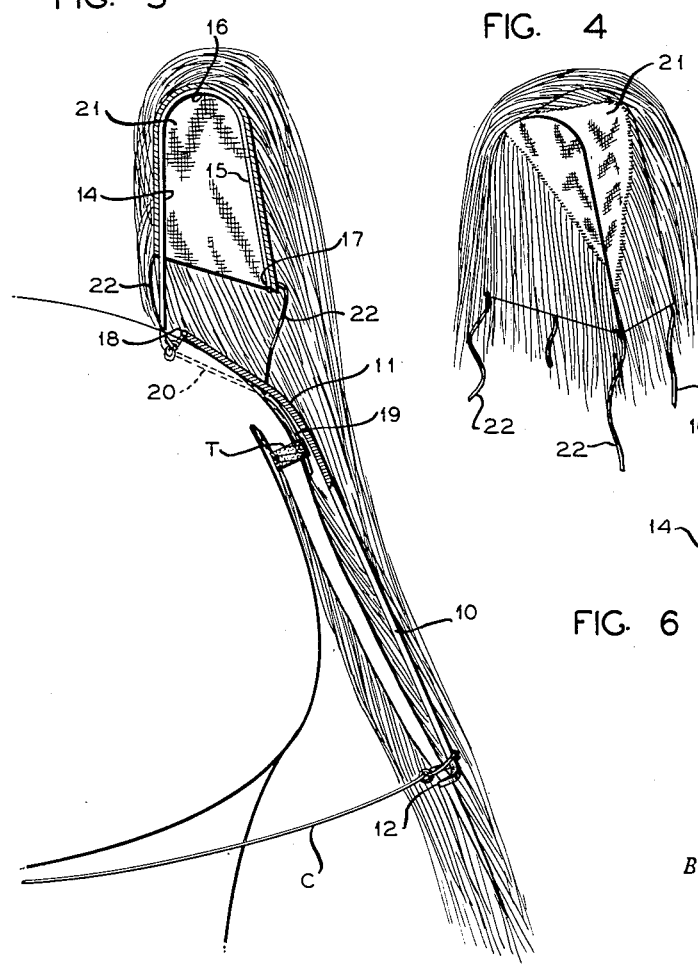
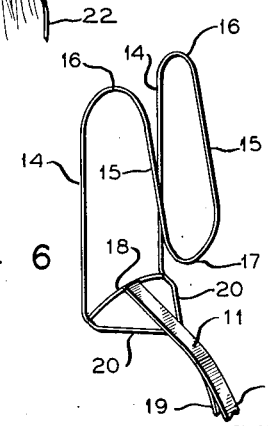
FIG. 6
INVENTOR.
C. C. TURNER
BY *A. Yates Dowell*
ATTORNEY United States Patent Office 2,763,111
Patented Sept. 18, 1956

2,763,111

HUMANE TAIL SET

Charles C. Turner, Broadway, Va., assignor of one-half to George S. Aldhizer II, Rockingham County, Va.

Application November 30, 1950, Serial No. 198,387

1 Claim. (Cl. 54—78)

This invention relates to devices for enhancing the appearance of the tail of a horse or other animal and more particularly to an improved device of the character set forth in applicant's United States Patent No. 2,484,766, dated October 11, 1949.

A most important consideration in connection with the exhibition or display of horses is the manner in which the animal holds its tail. The preferred angular relationship requires that the tail stand substanially erect adjacent to the body or buttocks of the horse and then immediately droop or extend downwardly. To attain this end, it has been, and in many localities remains, customary to resort to surgery to achieve this desirable posture.

Certain of the animal's tail muscles are severed, in particular locations both beneath and above the tail, and what may be referred to as the natural angular relationship is thereby altered in an effort to attain a position approaching perfection. Surgery of this character must be held to border on the inhumane and oftentimes the results obtained are far from satisfactory. Freedom of movement of the tail is seriously impaired and, by reason of the nature of the procedure involved, serious injury may be done the animal with, on occasion, disastrous results.

Applicant's prior United States patent, referred to hereabove, contemplates the provision of humane means for the improvement of the appearance of the tail of a horse, or other animal, whereby the desired results are obtained without any possibility of injury or discomfort to the animal. The present invention provides a simplified and improved structure for attaining similar results.

Accordingly, it is a major object of the present invention to provide an improved device for enhancing the appearance of the tail of an animal or horse, which may be readily positioned upon, or attached to the animal, and by means of which the desired erect appearance is obtained.

It is a further object of the invention to provide a device of the class set forth which can cause the animal no discomfort and which will not interfere in any manner with freedom of movement of the natural tail.

It is a still further object of the present invention to provide a device for enhancing the appearance of the tail of a horse or other animal which comprises a tail supplementation intended to be attached to and supported upon the natural tail of the animal during such intrevals as the animal is being displayed, or for longer time intervals.

It is a further object of the invention to provide a device of the class set forth which will so thoroughly blend with the natural tail as to create the appearance of superior posture and defy visual detection.

It is a still further object of the present invention to provide an improved device for enhancing the appearance of the tail of a horse or other animal which will be of simple and particularly light-weight construction, susceptible of being readily and removed, and which may be economically manufactured.

Further objects and advantages of the invention will be apparent from the following description taken in conjunction with the accompanying drawing, wherein:

Fig. 1 is a side elevational view illustrating a show horse in display posture, the tail of the animal being supplemented by the device of the present invention;

Fig. 2, a side elevational view of an improved frame for a supplemental tail;

Fig. 3, a rear elevational view of the frame illustrated in Fig. 2;

Fig. 4, a perspective view illustrating the upper portion of a supplemental tail adapted to be supported upon the frame illustrated in Figs. 2 and 3;

Fig. 5, a fragmentary view partly in elevation and partly in section illustrating the application of the invention to the natural tail of a horse; and Fig. 6, a fragmentary perspective view illustrating the upper portion of the frame disclosed in Figs. 2 and 3.

Briefly stated, the invention comprises a supplementary or auxiliary tail applicable to the natural tail of an animal for enhancing the appearance thereof whereby the aspect of superior posture is obtained.

The invention further comprises an improved supporting frame for the supplemental or auxiliary tail with appropriate attaching means whereby it may be secured to the natural tail, the fact that it is supplemental being imperceptible, so that both the supplemental and natural tails appear to be one and the same, a superiorly erect posture being thus created.

In accordance with the present invention, the supplemental or auxiliary tail illustrated includes a supporting frame of as light-weight material as practicable so as to add as little dead weight as possible to the animal to which the device is applied. Suitable materials may include plastics, wood, metal, wire or the like, a skeleton frame may be utilized, as illustrated, or sheet material of sufficient rigidity may be conveniently employed.

With continued reference to the drawing, a preferred embodiment of supporting frame includes a lower bar-like member 10, manufactured from flat or sheet material, and having an angularly directed upper extremity 11. The angular relationship between the portions 10 and 11 is such that, when the device is applied to an animal, the upper portion will rest upon the base of the animal's back, immediately adjacent the tail, while the lower portion will incline downwardly, substantially following the natural inclination of the animal's tail. The lower extremity of the member 10 terminates in a pair of opposed, arcuate arms or fingers 12 which are intended to embrace the natural tail of an animal, substantially adjacent the lower extremity thereof, when the device is in applied position. The fingers 12 are forwardly directed and an aperture 13 is provided in the member 10, positioned slightly above these arms, for a purpose to be described more fully hereinafter.

While the bar 10 is of sufficient rigidity to withstand ordinary usage, the fingers 12 may, if desired, have sufficient flexibility to permit the bending or closing thereof to gently and snugly embrace the lower extremity of the natural tail of the animal, thus to assist in maintaining the device in applied position and guard against the inadvertent displacement thereof.

Fixedly secured to the upper extremity 11 of the lower member 10 is an upper member or support which comprises a substantially vertically disposed forward portion 14 and a rear portion 15 spaced from said forward portion and disposed in either parallel relation with respect thereto or, preferably, inclining outwardly and downwardly therefrom whereby the width of the upper member increases slightly and gradually, from top to bottom. Obviously, where the upper member is formed from sheet material, it may conveniently be bent upon itself to provide an arcuate connecting portion 16 between the forward and rear portions thereof; similarly, as illustrated, where the upper member is formed from wire-like material for purposes of weight conservation, forward and rear portions are defined by spaced and complementary stretches of said wire-like material, and an arcuate portion 17 defining the lower extremity of the rear portion where such extremity is spaced from the lower member 10.

As will be more readily apparent from an examination of Fig. 3 of the drawing, an arcuate bridge or saddle member 18 connects the upper extremity of the lower member with the spaced stretches of wire-like material defining the forward portion 14 of the support, it being intended that this bridge will rest securely and comfortably upon the rump of the animal when the device is in applied position.

The lower member 10 is further provided with a downwardly directed hook-like member 19, positioned on the forward face thereof adjacent the point of merging of the member 10 with the angularly directed upper extremity 11. Welding or other suitable fastening means may be employed to secure this hook member in position as well as to unite the bridge member 18 with the spaced edges of the forward portion of the support and the upper extremity of the portion 11.

The hook-like member 19 may, if desired, be separately conformed or the lower extremities 20 of the wire-like material defining the forward portion 14 of the support may be angularly directed, converging toward each other, and united as by welding to provide an integral hook-like portion.

The supplemental or auxiliary tail member per se comprises a hood or cap 21, manufactured from any suitable material, which fits snugly over the upper supporting member and has horse-hair stitched or otherwise secured thereto in an adequate amount and length so as to provide the requisite bulk and flowing appearance to blend with and enhance the appearance of the natural tail of the animal upon which the device is applied.

The procedure required for mounting the improved device of the instant invention is particularly simple. A wrapping of suitable material, such as adhesive tape T or the like, is placed upon the natural tail of the animal, as far or high up as may be accomplished conveniently. This wrapping should not be particularly tight, since freedom of circulation must not be impaired, the nature of the material employed being such that adhesion to either skin and/or hair will prevent it from slipping out of place. The hook-like member 19 is then inserted beneath the tape wrapping in the center of the upper side of the natural tail and the bar 10 is pressed downwardly until the upper extremity 11, thereof rests firmly upon the rump of the animal. Preferably, the hair over the upper part of the natural tail is parted in an effort to provide a comfortable fit and partially conceal the upper portion of the member 10 and the arcuate fingers 12 are positioned about the lower extremity of the tail bone, beneath the hair. As an additional precaution, a suitable cord C or other tie member is tied about the tail bone and engaged with the aperture 13 in the lower end of the member 10. The cord C is then brought forward, between the animal's legs and passed through a ring R on the girth G, and desired means being provided for securing the opposite extremity of the cord to the girth or saddle in a manner to permit the convenient release or adjustment thereof. The device may thus be maintained securely in position with no likelihood of the support or brace bouncing upwardly and becoming detached from the tape.

The hood or cap 21 is then positioned upon the upper supporting member with the hair of the supplemental tail flowing downwardly and blending or merging with the hair of the natural tail to enhance the appearance thereof by creating an appearance of posture considered by showmen to be superior. It will be observed from an examination of Fig. 4 of the drawing that the hood 21 is provided with thongs or cords 22 located at the corners thereof. These cords are engaged with adjacent portions of the bridge member 18, the converging lower extremities 20, or beneath the upper portion 11 of the lower member 10, to securely tie the hood in position and prevent the inadvertent displacement thereof. On windy days, or whenever desired, a single hair (not shown) may be tied about the combined supplemental and natural tails in an appropriate location to prevent blowing. If desired, instead of employing animal hair in the manufacture of the auxiliary tail, any suitable plastic material such, for example, as nylon may be conveniently employed.

From the foregoing it will be readily understood that by the present invention a horse or other animal being shown, whether under saddle, in action at various gaits, or in other types or forms of competition, will be provided with a tail posture of superior appearance, without resorting to either surgery or a restraining device of such character as to cause discomfort.

It will be obvious to those skilled in the art that various changes may be made in the invention without departing from the spirit and scope thereof and therefore the invention is not limited by that which is shown in the drawing and described in the specification but only as indicated in the accompanying claim.

What is claimed is:

A frame for supporting an auxiliary tail provided with a hood for an animal comprising a relatively flat bar-like member provided with an angularly directed upper extremity, forwardly directed rigid fingers formed integrally upon the lower extremity of said bar-like member for embracing the natural tail of an animal and preventing lateral movement of said natural tail separately of said bar-like member, flexible means for preventing inadvertent separation between said fingers and the adjacent portion of the natural tail, an upper arcuate supporting member mounted upon said bar-like member and extending laterally on both sides thereof, said bar-like member being substantially centered with respect to said upper supporting member, said upper supporting member comprising a substantially vertically disposed forward portion, an arcuate upper portion and a depending rear portion spaced from said forward portion and disposed in substantial parallelism with respect thereto, said arcuate portion being curved to receive the hood of the auxiliary tail, the free lower extremity of said depending rear portion being spaced from the adjacent portion of said bar-like member, said forward portion having its lower end depending angularly therefrom in closed spaced relation to the forward surface of said bar-like member at a point remote from said rigid fingers to constitute a rigid hook-like member, flexible means for securing the natural tail of an animal to said hook-like member, and an arcuate bridge member connecting the upper extremity of said bar-like member to said substantially vertically disposed forward portion adjacent the lower extremity thereof.

References Cited in the file of this patent

UNITED STATES PATENTS

| 568,121 | Varian | Sept. 22, 1896 |
| 770,188 | Rutherford | Sept. 13, 1904 |
| 785,457 | Warwick | Mar. 21, 1905 |
| 2,484,766 | Turner | Oct. 11, 1949 |
| 2,624,996 | Laningham | Jan. 13, 1953 |

FOREIGN PATENTS

| 237,952 | Germany | Sept. 25, 1911 |